(12) United States Patent
Lee et al.

(10) Patent No.: US 9,715,084 B2
(45) Date of Patent: Jul. 25, 2017

(54) PHOTOGRAPHIC LENS OPTICAL SYSTEM

(71) Applicant: KOLEN CO., LTD., Gyeonggi-do (KR)

(72) Inventors: Jong Jin Lee, Seoul (KR); Chan Goo Kang, Gyeonggi-do (KR); Seong Hee Bae, Gyeonggi-do (KR)

(73) Assignee: Kolen Co., Ltd (KR)

( * ) Notice: Subject to any disclaimer, the term of this patent is extended or adjusted under 35 U.S.C. 154(b) by 0 days.

(21) Appl. No.: 15/196,516

(22) Filed: Jun. 29, 2016

(65) Prior Publication Data
US 2017/0176718 A1    Jun. 22, 2017

(30) Foreign Application Priority Data
Dec. 18, 2015 (KR) .................. 10-2015-0181842

(51) Int. Cl.
| | |
|---|---|
| *G02B 13/18* | (2006.01) |
| *G02B 3/02* | (2006.01) |
| *G02B 9/12* | (2006.01) |
| *G02B 9/14* | (2006.01) |
| *G02B 13/00* | (2006.01) |
| *G02B 1/04* | (2006.01) |
| *G02B 5/20* | (2006.01) |
| *G02B 27/00* | (2006.01) |

(52) U.S. Cl.
CPC ......... *G02B 13/0035* (2013.01); *G02B 1/041* (2013.01); *G02B 5/208* (2013.01); *G02B 9/14* (2013.01); *G02B 27/0025* (2013.01)

(58) Field of Classification Search
CPC ........ G02B 13/0035; G02B 9/12; G02B 9/14; G02B 9/16
USPC .......................... 359/708, 716, 753, 784, 785
See application file for complete search history.

(56) References Cited

U.S. PATENT DOCUMENTS

2016/0085051 A1* 3/2016 Lee .................... G02B 13/0035 359/716

\* cited by examiner

*Primary Examiner* — William Choi
(74) *Attorney, Agent, or Firm* — Fitch Even Tabin & Flannery LLP

(57) ABSTRACT

Provided are lens optical systems. A lens optical system includes first to third lenses sequentially arranged in a direction from an object to an image sensor. The first lens may have a positive refractive power and an entrance surface convex toward the object. The second lens may have a negative refractive power and a meniscus shape convex toward the image sensor. The third lens may have a positive refractive power, and at least one of entrance and exit surfaces of the third lens may have an inflection point in a direction from a center region toward an edge thereof. The outer diameter D3 (in millimeters) of the exit surface of the third lens and the diagonal length $ImgH_{MAX}$ of a maximum pixel region of the image sensor may satisfy $2.6<D3<3.0$ and $1.3<ImgH_{MAX}/D3<1.5$. The system may have a field of view (FOV) of about 75° to about 85°.

15 Claims, 11 Drawing Sheets

PHOTOGRAPHIC LENS OPTICAL SYSTEM

CROSS-REFERENCE TO RELATED APPLICATION

This application claims the benefit of Korean Patent Application No. 10-2015-0181842, filed on Dec. 18, 2015, in the Korean Intellectual Property Office, the disclosure of which is incorporated herein in its entirety by reference.

BACKGROUND

1. Field

One or more embodiments relate to an optical device, and more particularly, to a photographic lens optical system for cameras.

2. Description of the Related Art

Recently, the use and application of cameras including solid-state imaging devices such as complementary metal oxide semiconductor (CMOS) image sensors or charge coupled devices (CCDs) have greatly increased. Also, the degree of pixel integration in solid-state imaging devices has increased to improve the resolution of cameras. Along with this, small and lightweight cameras have been developed by improving the performance of lens optical systems included in the cameras.

In general, lens optical systems of small cameras are constituted by many lenses, for example, at least four lenses, so as to guarantee performance. For example, lens optical systems of high pixel count cameras generally include four or five lenses. If a lens optical system includes many lenses, the field of view (FOV) and aberration correcting ability of the lens optical system may be improved. However, it may be difficult to reduce the size and weight of the lens optical system and the size and weight of a camera using the lens optical system. In addition, lens optical systems of existing camera phones include at least one glass lens to improve performance. However, manufacturing costs of glass lenses are relatively high, and it is difficult to reduce the size of lens optical systems including glass lenses because of limitations in forming/processing glass lenses.

Therefore, there is a need for a small, wide-FOV lens optical system having improved properties such as a high aberration correcting ability and a high degree of resolution.

SUMMARY

One or more embodiments include a lens optical system having a (very) small size, a wide field of view (FOV), and a high degree of performance.

One or more embodiments include a lens optical system having a (very) small size and a high degree of brightness.

One or more embodiments include a lens optical system that may be manufactured with low costs by constructing the lens optical system without glass lenses.

Additional aspects will be set forth in part in the description which follows and, in part, will be apparent from the description, or may be learned by practice of the presented embodiments.

According to one or more embodiments, a lens optical system includes a first lens, a second lens, and a third lens sequentially arranged in a direction away from an object between the object and an image sensor on which an image of the object is formed, wherein the first lens has a positive (+) refractive power and an entrance surface convex toward the object, the second lens has a negative (−) refractive power and a meniscus shape convex toward the image sensor, the third lens has a positive (+) refractive power, and at least one of an entrance surface and an exit surface of the third lens has an inflection point in a direction away from a center region toward an edge thereof.

The lens optical system may satisfy at least one of the following formulas 1 to 7:

$$2.6 < D3 < 3.0 \quad \text{Formula 1:}$$

where D3 refers to an outer diameter of the exit surface of the third lens in millimeters (mm)

$$1.3 < ImgH_{MAX}/D3 < 1.5 \quad \text{Formula 2:}$$

where $ImgH_{MAX}$ refers to a diagonal length of a maximum pixel region of the image sensor.

$$75° < FOV < 85° \quad \text{Formula 3:}$$

where FOV refers to a field of view (θ) of the lens optical system.

$$2.0 < Fno < 2.3 \quad \text{Formula 4:}$$

where Fno may be an F-number of the lens optical system.

$$0.75 < TTL/ImgH < 0.83 \quad \text{Formula 5:}$$

where TTL refers to a distance from the entrance surface of the first lens to the image sensor, and ImgH refers to a diagonal length of an effective pixel region of the image sensor.

$$0.55 < f/ImgH < 0.70 \quad \text{Formula 6:}$$

where f refers to a total focal length of the lens optical system, and ImgH refers to a diagonal length of an effective pixel region of the image sensor.

$$1.55 < (Nd2+Nd3)/2 < 1.65 \quad \text{Formula 7:}$$

where Nd2 refers to an refractive index of the second lens, and Nd3 refers to a refractive index of the third lens.

The first lens may have an exit surface convex toward the image sensor.

The first lens has an exit surface concave toward the image sensor.

The entrance surface of the third lens may be convex toward the object in a center region of the entrance surface and concave toward the object in a region defined from the center region toward an edge of the entrance surface, and the exit surface of the third lens may be concave toward the image sensor in a center region of the entrance surface and convex toward the image sensor in a region defied from the center region toward an edge of the exit surface.

The first to third lenses may be aspherical lenses.

The first to third lenses may be plastic lenses.

An aperture stop may be arranged between the object and the image sensor.

The aperture stop may be arranged between the object and the first lens.

An infrared blocking element may be further arranged between the object and the image sensor.

The infrared blocking member may be arranged between the third lens and the image sensor.

According to one or more embodiments, a lens optical system including a first lens, a second lens, and a third lens sequentially arranged in a direction away from an object between the object and an image sensor on which an image of the object is formed, wherein the first lens, the second lens, and the third lens have positive (+), negative (−), and positive (+) refractive powers, respectively, and the lens optical system satisfies the following formulas:

$2.6 < D3 < 3.0$ $1.3 < ImgH_{MAX}/D3 < 1.5$ $75° < FOV < 85°$ $2.0 < Fno < 2.3$ where D3 refers to an outer diameter of an exit surface of the third lens in millimeters (mm), $ImgH_{MAX}$ refers to a diagonal length of a maximum pixel region of the image sensor, FOV refers to a field of view of the lens optical system, and Fno is an F-number of the lens optical system.

The lens optical system may satisfy at least one of the following formulas:

$0.75 < TTL/ImgH < 0.83$ $0.55 < f/ImgH < 0.70$ $1.55 < (Nd2+Nd3)/2 < 1.65$ where TTL refers to a distance from an entrance surface of the first lens to the image sensor, ImgH refers to a diagonal length of an effective pixel region of the image sensor, f refers to a focal length of the lens optical system, Nd2 refers to an refractive index of the second lens, and Nd3 refers to a refractive index of the third lens.

The first lens may be convex toward the object.

The second lens may be convex toward the image sensor.

The third lens may be an aspherical lens. At least one of entrance and exit surfaces of the third lens may have an inflection point in a direction away from a center region toward an edge thereof.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
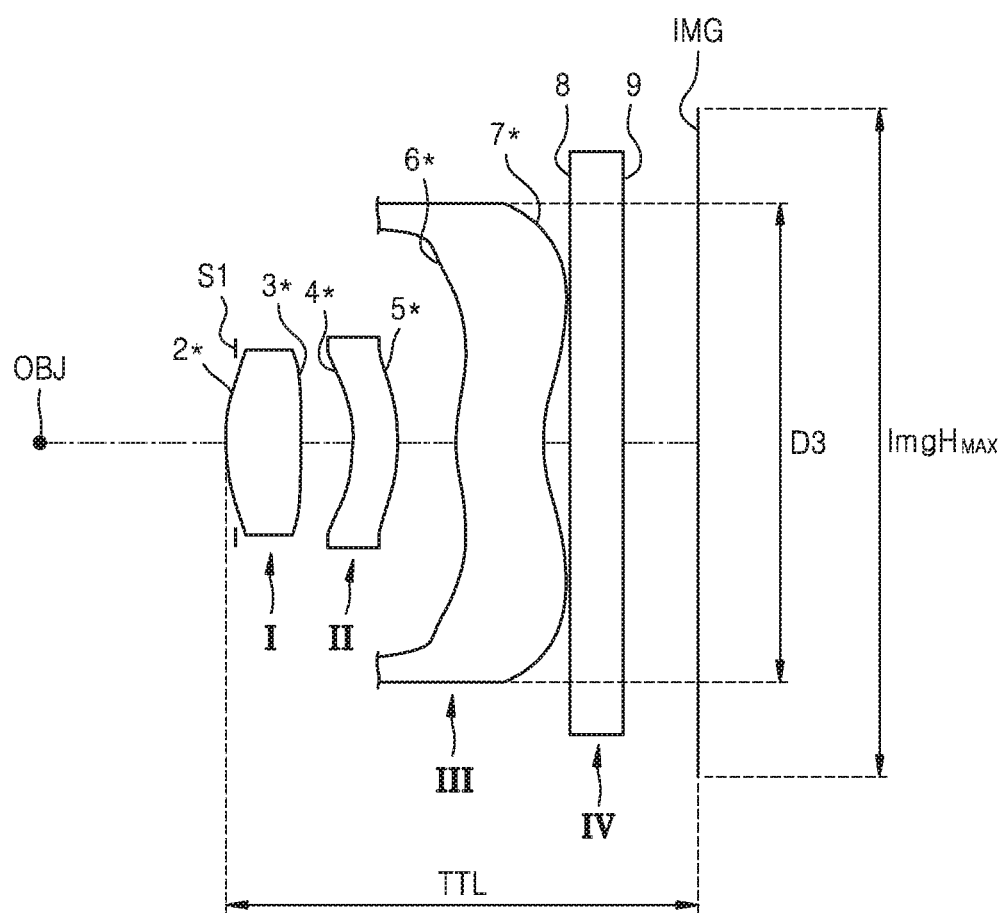
FIGS. 1 to 5 are cross-sectional views illustrating arrangements of main elements of lens optical systems according to first to fifth embodiments.
Figure 2:
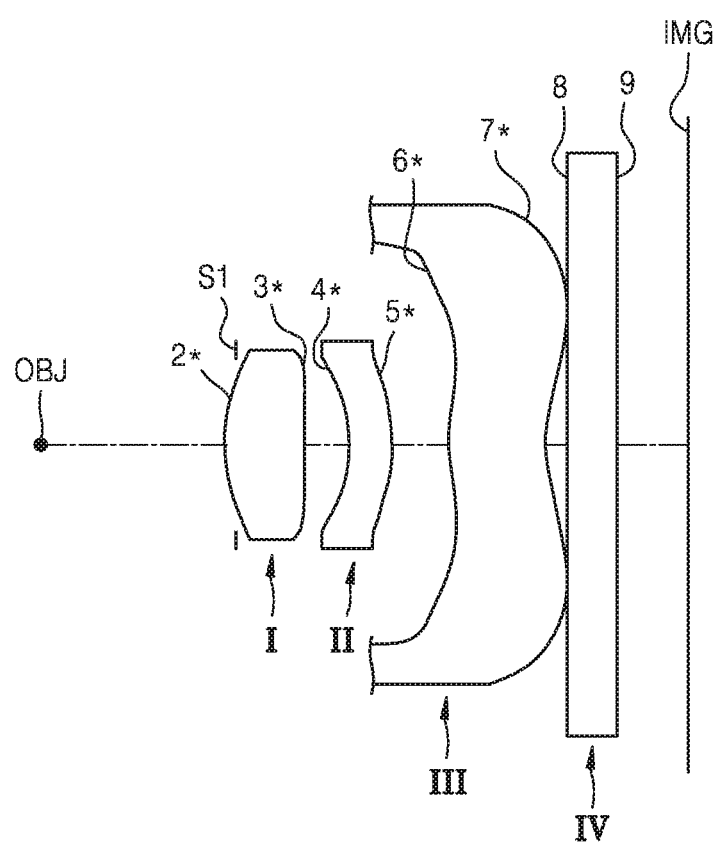
Figure 3:
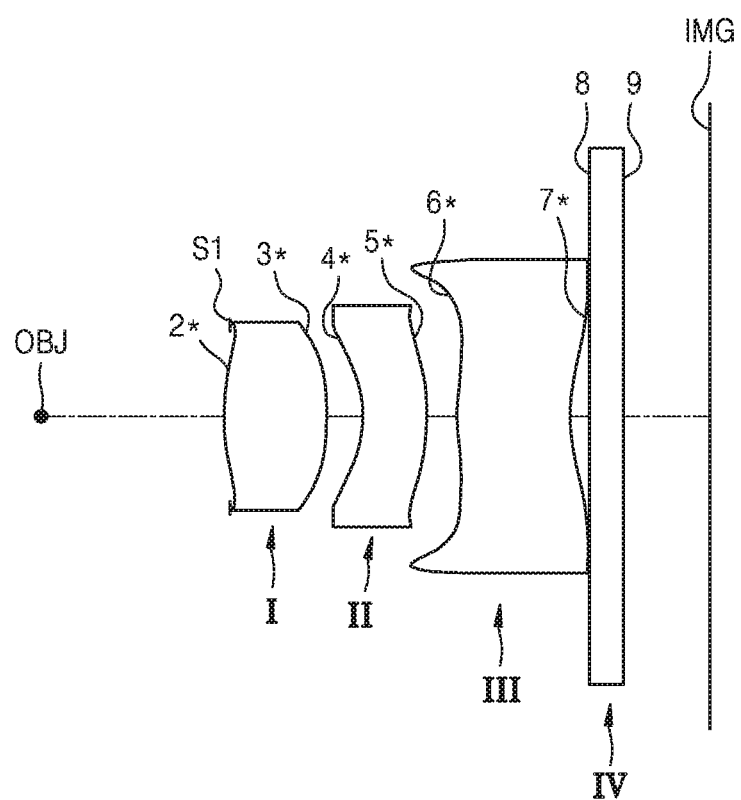
Figure 4:
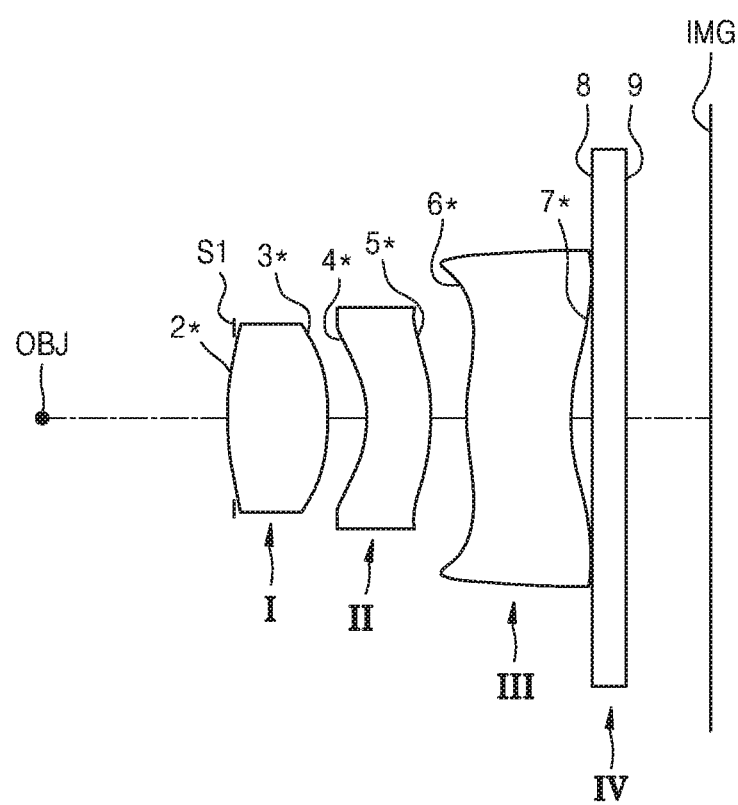
Figure 5:
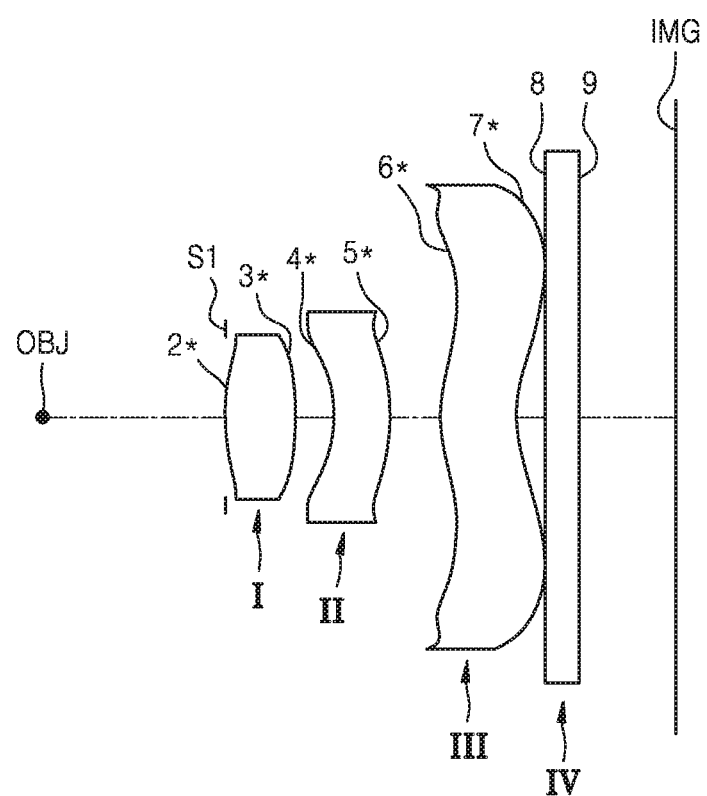

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed. Expressions such as "at least one of," when preceding a list of elements, modify the entire list of elements and do not modify the individual elements of the list.

Hereinafter, lens optical systems will be described with reference to the accompanying drawings according to embodiments. In the drawings, like reference numerals refer to like (or similar) elements.

FIGS. 1 to 5 illustrate lens optical systems according to first to fifth embodiments.

Referring to FIGS. 1 to 5, each of the lens optical systems of the first to fifth embodiments includes a first lens I, a second lens II, and a third lens III that are sequentially arranged in a direction away from an object OBJ between the object OBJ and an image sensor IMG on which an image of the object OBJ may be formed. The first lens I may have a positive (+) refractive power, and an entrance surface 2* of the first lens I may convex toward the object OBJ. An exit surface 3* of the first lens I may convex or concave toward the image sensor IMG. The exit surface 3* of the first lens I is convex toward the image sensor IMG in the embodiments shown in FIGS. 1, 3, 4, and 5 and concave toward the image sensor IMG in the embodiment shown in FIG. 2. In the embodiment shown in FIG. 2, a center region (through which an optical axis passes) of the exit surface 3* of the first lens I is slightly concave toward the image sensor IMG. In the embodiments shown in FIGS. 1, 3, 4, and 5, the first lens I may be a biconvex lens. The second lens II may have a negative (−) refractive power and a meniscus shape convex toward the image sensor IMG. Therefore, an entrance surface 4* and an exit surface 5* of the second lens II may be convex toward the image sensor IMG. The third lens III may have a positive (+) refractive power, and at least one of an entrance surface 6* and an exit surface 7* of the third lens III may have an inflection point in a direction away from a center region toward an edge thereof. The entrance surface 6* of the third lens III may have one or more inflection points in the direction from the center region to the edge of the entrance surface 6*, and the exit surface 7* of the third lens III may have an inflection point in the direction from the center region to the edge of the exit surface 7*. The entrance surface 6* of the third lens III may be convex toward the object OBJ in the center region thereof and concave toward the object OBJ in a region defined from the center region toward the edge of the entrance surface 6*, and the exit surface 7* of the third lens III may be concave toward the image sensor IMG in the center region thereof and convex toward the image sensor IMG in a region defined from the center region toward the edge of the exit surface 7*. All of the first to third lenses I to III may be aspherical lenses. In other words, the entrance surfaces 2*, 4*, and 6*, and the exit surfaces 3*, 5*, and 7* of the first to third lenses I to III may be aspherical surfaces. Each of the first to third lenses I to III may include a plastic material.

An aperture stop S1 and an infrared blocking element IV may be further provided. The aperture stop S1 may be arranged along an object side of the first lens I. That is, the aperture stop S1 may be between the object OBJ and the first lens I. The infrared blocking element IV may be between the third lens III and the image sensor IMG. The infrared blocking element IV may be an infrared blocking filter. The positions of the aperture stop S1 and the infrared blocking element IV may be changed.

Each lens optical system of the embodiments may satisfy at least one of the following Formulas 1 to 7.

$$2.6 < D3 < 3.0 \quad \text{Formula 1:}$$

$$1.3 < ImgH_{MAX}/D3 < 1.5 \quad \text{Formula 2:}$$

where D3 refers to the outer diameter of the exit surface 7* of the third lens III in millimeters (mm), and $ImgH_{MAX}$ refers to the diagonal length of a maximum pixel region of the image sensor IMG.

Formulas 1 and 2 relate to a relationship between the outer diameter D3 of the exit surface 7* of the third lens III and the diagonal length $ImgH_{MAX}$ of the maximum pixel region of the image sensor IMG. Since the third lens III has the largest outer diameter among the three lenses I to III, the outer diameter of the lens optical system may be determined by D3. In the embodiments, D3 may be smaller than about 3.0 mm, and $ImgH_{MAX}$ may be relatively large. If Formulas 1 and 2 are satisfied, the lens optical system may have a small outer diameter and may be advantageous to realize a high pixel density. In addition, the lens optical system may have a wide field of view (FOV) and a high degree of brightness even though the lens optical system has a small outer diameter. Formula 3 below describes conditions for a wide FOV, and Formula 4 below describes conditions for a high degree of brightness.

$$75° < FOV < 85° \quad \text{Formula 3:}$$

where FOV refers to the field of view (angle of view, θ) of the lens optical system. The FOV may be a diagonal FOV of the lens optical system.

If Formula 3 is satisfied, the lens optical system including three lenses may have a wide FOV. In general, the FOV of a lens optical system constituted by three lenses ranges from about 60° to about 63°. It is not easy to manufacture a lens optical system including three lenses (that is, a small lens optical system) to have a wide FOV on the level of 70° or greater. According to the embodiments, however, lens designs are properly adjusted, and thus the lens optical system may have a small size (very small size) and a wide FOV equal to or greater than 75°.

$$2.0 < Fno < 2.3 \quad \text{Formula 4:}$$

where Fno is the F-number of the lens optical system.

Formula 4 relates to the brightness of the lens optical system. The F-number Fno is the ratio of the focal length to the effective diameter of the lens optical system, and if the F-number Fno of the lens optical system is low, the lens optical system may have high brightness. In general, a lens optical system having three lenses has an F-number Fno of about 2.8. According to the embodiments, however, lens designs are properly adjusted, and thus the lens optical system including three lenses may have an F-number Fno of about 2.3 or less. In other words, according to the embodiments, the lens optical system may have a small size (very small size) and a high degree of brightness. Thus, bright images may be easily provided using the lens optical system.

$$0.75 < TTL/ImgH < 0.83 \quad \text{Formula 5:}$$

where TTL refers to the distance from the entrance surface 2* of the first lens I to the image sensor IMG, that is, the total length of the lens optical system, and ImgH refers to the diagonal length of an effective pixel region of the image sensor IMG.

Formula 5 regulates the ratio of the total length TTL of the lens optical system to an image size (that is, ImgH). In Formula 5, the more TTL/ImgH approaches the lower limit, 0.75, the more the lens optical system may become compact. However, if TTL/ImgH is less than the lower limit, 0.75, aberrations such as spherical aberration may increase. As TTL/ImgH approach the upper limit, 0.83, aberrations may be more effectively corrected. However, if TTL/ImgH is greater than the upper limit, 0.83, the total length TTL of the lens optical system may be large, making it difficult to manufacture the lens optical system to have a compact structure. Therefore, TTL/ImgH may be maintained within the above-mentioned range for the compactness and performance of the lens optical system.

$$0.55 < f/ImgH < 0.70 \quad \text{Formula 6:}$$

where f refers to the total focal length of the lens optical system, and ImgH refers to the diagonal length of the effective pixel region of the image sensor IMG.

Formula 6 regulates the ratio of the total focal length of the lens optical system to the image size (that is, ImgH). If f/ImgH of Formula 6 approaches or becomes equal to or less than the lower limit, 0.55, even though the lens optical system may have a short focal length, it may be difficult to adjust aberrations of the lens optical system. On the other hand, if f/ImgH approaches or becomes equal to or greater than the upper limit, 0.70, even though it is easy to adjust aberrations of the lens optical system, the focal length of the lens optical system may not be proper.

$$1.55 < (Nd2+Nd3)/2 < 1.65 \quad \text{Formula 7:}$$

where Nd2 refers to the refractive index of the second lens II, and Nd3 refers to the refractive index of the third lens III.

Formula 7 describes materials of the second lens II and the third lens III. If Formula 7 is satisfied, inexpensive plastic lenses may be used as the second lens II and the third lens III. Therefore, according to the embodiments, costs may be decreases. In addition, if Formula 7 is satisfied, the refractive indexes of the second and third lenses II and III may be properly adjusted to address problems such as coma aberration and astigmatic aberration.

$ImgH_{MAX}$ and ImgH in Formulas 2, 5, and 6 will now be described with reference to FIG. 6.

Figure 6:
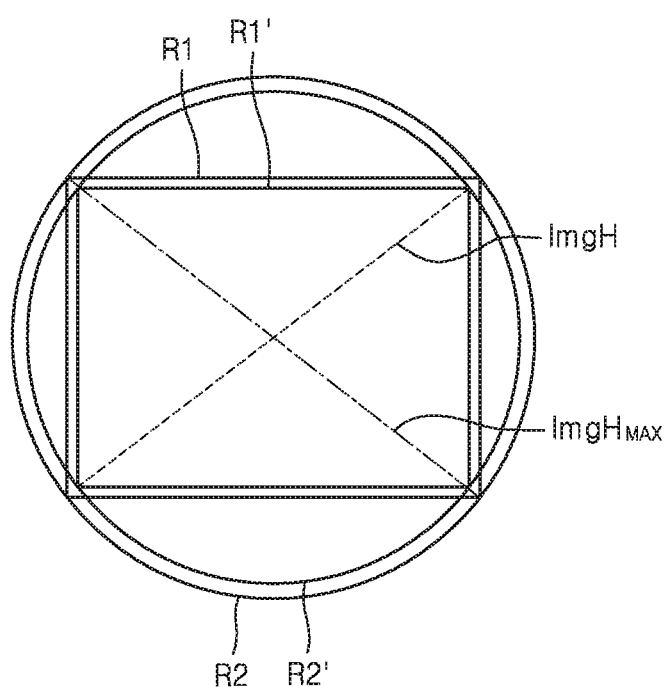
FIG. 6 is a plan view illustrating a diagonal length of a maximum pixel region of an image sensor and a diagonal length of an effective pixel region of the image sensor in each of the lens optical systems of the embodiments.

FIG. 6 is a plan view illustrating the diagonal length $ImgH_{MAX}$ of the maximum pixel region of the image sensor IMG and the diagonal length ImgH of the effective pixel region of the image sensor IMG in each of the lens optical systems of the embodiments. In FIG. 6, R1 refers to the maximum pixel region, R1' refers to the effective pixel region, R2 refers to a maximum image region, and R2' refers to an effective image region in each of the lens optical systems. The maximum pixel region R1 may be referred to as a maximum sensor region, and the effective pixel region R1' may be referred to as an effective sensor region. The maximum image region R2 may be a maximum region of an image formed by the lens optical system. The image regions R2 and R2' may be referred to as image circles.

Referring to FIG. 6, the pixel regions R1 and R1' may have a quadrangular (rectangular) shape, and the image regions R2 and R2' may have a circular shape. The diameter of the effective image region R2' may be smaller than the diagonal length of the maximum pixel region R1. The diameter of the effective image region R2' may correspond to the diagonal of the effective pixel region R1', and the diameter of the maximum image region R2 may correspond to the diagonal of the maximum pixel region R1. Therefore, a diameter (line) of the effective image region R2' may correspond to the diagonal length ImgH of the effective pixel region R1', and a diameter (line) of the maximum image region R2 may correspond to the diagonal length $ImgH_{MAX}$ of the maximum pixel region R1. The pixel regions R1 and R1' and the image regions R2 and R2' illustrated in FIG. 6 are examples and may be varied.

Values of criteria of Formulas 1 to 7 in the first to fifth embodiments are shown in Table 1 below. In Table 1, D3 is given in millimeters (mm), and FOV is given in degrees) (°). Table 2 shows values of variables used to obtain data shown in Table 1. In Table 2, $ImgH_{MAX}$, ImgH, TTL, and f are given in millimeters (mm).

TABLE 1

| No. | Criteria | First embodiment | Second embodiment | Third embodiment | Fourth embodiment | Fifth embodiment |
|---|---|---|---|---|---|---|
| Formula 1 | D3 | 2.791 | 2.861 | 2.758 | 2.778 | 2.841 |
| Formula 2 | $ImgH_{MAX}$/D3 | 1.397 | 1.363 | 1.396 | 1.380 | 1.350 |
| Formula 3 | FOV | 80.536 | 80.091 | 78.639 | 78.829 | 81.820 |
| Formula 4 | Fno | 2.28 | 2.20 | 2.28 | 2.28 | 2.24 |
| Formula 5 | TTL/ImgH | 0.7631 | 0.7631 | 0.8182 | 0.8287 | 0.7729 |
| Formula 6 | f/ImgH | 0.622 | 0.624 | 0.632 | 0.635 | 0.606 |
| Formula 7 | (Nd2 + Nd3)/2 | 1.595 | 1.595 | 1.595 | 1.595 | 1.595 |

TABLE 2

| | First embodiment | Second embodiment | Third embodiment | Fourth embodiment | Fifth embodiment |
|---|---|---|---|---|---|
| $ImgH_{MAX}$ | 3.900 | 3.900 | 3.850 | 3.834 | 3.834 |
| ImgH | 3.630 | 3.630 | 3.630 | 3.584 | 3.584 |
| TTL | 2.770 | 2.770 | 2.970 | 2.970 | 2.770 |
| f | 2.257 | 2.266 | 2.292 | 2.276 | 2.171 |
| Nd2 | 1.656 | 1.656 | 1.656 | 1.656 | 1.656 |
| Nd3 | 1.533 | 1.533 | 1.533 | 1.533 | 1.533 |

Referring to Tables 1 and 2, the lens optical systems of the first to fifth embodiments satisfy Formulas 1 to 7.

In the lens optical systems of the embodiments, the first to third lenses I to III may be formed of a plastic material when the shapes and dimensions thereof are considered. That is, all of the first to third lenses I to III may be plastic lenses. Due to high manufacturing costs of glass lenses and limitations in forming processes of glass lenses, it is difficult to manufacture small lens optical systems using glass lenses. In the embodiments, however, all the first to third lenses I to II may be formed of a plastic material, and thus various properties may be obtained. However, materials that may be used to form the first to third lenses I to III are not limited to a plastic material. If necessary, at least one of the first to third lenses I to III may be formed of glass.

Hereinafter, the first to fifth embodiments will be described with reference to lens data and the accompanying drawings.

Tables 3 to 7 below shows data such as the radii of curvature, thicknesses or intervals, refractive indexes, and Abbe numbers of the lenses of the lens optical systems shown in FIGS. 1 to 5. In Tables 3 to 7, R denotes a radius of curvature, D denotes the thicknesses of a lens, an interval between lenses, or an interval between adjacent elements, Nd denotes a refractive index of a lens measured using the d-line, and Vd denotes an Abbe number of a lens with respect to the d-line. If "*" is attached to a surface number, the surface is aspherical. R and D are expressed in millimeters (mm).

TABLE 3

| First embodiment | Surfaces | R | D | Nd | Vd |
|---|---|---|---|---|---|
| | S1 | Infinity | | | |
| I | 2* | 1.1060 | 0.4399 | 1.533 | 55.878 |
| | 3* | −26.0464 | 0.3029 | | |
| II | 4* | −1.0379 | 0.2583 | 1.656 | 21.474 |
| | 5* | −1.5000 | 0.3458 | | |
| III | 6* | 1.0506 | 0.5088 | 1.533 | 55.878 |
| | 7* | 0.9246 | 0.1560 | | |

TABLE 3-continued

| First embodiment | Surfaces | R | D | Nd | Vd |
|---|---|---|---|---|---|
| IV | 8 | Infinity | 0.3000 | | |
| | 9 | Infinity | 0.4633 | | |
| | IMG | Infinity | −0.0050 | | |

TABLE 4

| Second embodiment | Surfaces | R | D | Nd | Vd |
|---|---|---|---|---|---|
| | S1 | Infinity | | | |
| I | 2* | 0.9815 | 0.4804 | 1.533 | 55.878 |
| | 3* | 10.7959 | 0.2576 | | |
| II | 4* | −1.1074 | 0.2591 | 1.656 | 21.474 |
| | 5* | −1.5917 | 0.3438 | | |
| III | 6* | 1.2731 | 0.5801 | 1.533 | 55.878 |
| | 7* | 1.0770 | 0.1190 | | |
| IV | 8 | Infinity | 0.3000 | | |
| | 9 | Infinity | 0.4315 | | |
| | IMG | Infinity | −0.0015 | | |

TABLE 5

| Third embodiment | Surfaces | R | D | Nd | Vd |
|---|---|---|---|---|---|
| | S1 | Infinity | | | |
| I | 2* | 1.3966 | 0.6306 | 1.533 | 55.878 |
| | 3* | −1.3807 | 0.2191 | | |
| II | 4* | −0.7252 | 0.3923 | 1.656 | 21.474 |
| | 5* | −1.8088 | 0.1881 | | |
| III | 6* | 1.2177 | 0.6991 | 1.533 | 55.878 |
| | 7* | 1.1405 | 0.1107 | | |
| IV | 8 | Infinity | 0.2100 | | |
| | 9 | Infinity | 0.5200 | | |
| | IMG | Infinity | 0.0000 | | |

TABLE 6

| Fourth embodiment | Surfaces | R | D | Nd | Vd |
|---|---|---|---|---|---|
|  | S1 | Infinity |  |  |  |
| I | 2* | 1.4230 | 0.6194 | 1.533 | 55.878 |
|  | 3* | −1.5780 | 0.2335 |  |  |
| II | 4* | −0.7701 | 0.3951 | 1.656 | 21.474 |
|  | 5* | −1.7967 | 0.2211 |  |  |
| III | 6* | 1.0612 | 0.6384 | 1.533 | 55.878 |
|  | 7* | 1.0098 | 0.1324 |  |  |
| IV | 8 | Infinity | 0.2100 |  |  |
|  | 9 | Infinity | 0.5200 |  |  |
|  | IMG | Infinity | 0.0000 |  |  |

TABLE 7

| Fifth embodiment | Surfaces | R | D | Nd | Vd |
|---|---|---|---|---|---|
|  | S1 | Infinity |  |  |  |
| I | 2* | 1.2445 | 0.4273 | 1.533 | 55.878 |
|  | 3* | −2.9184 | 0.2384 |  |  |
| II | 4* | −0.8214 | 0.3432 | 1.656 | 21.474 |
|  | 5* | −1.5122 | 0.3140 |  |  |
| III | 6* | 0.8394 | 0.4685 | 1.533 | 55.878 |
|  | 7* | 0.8384 | 0.1686 |  |  |
| IV | 8 | Infinity | 0.2100 |  |  |
|  | 9 | Infinity | 0.6000 |  |  |
|  | IMG | Infinity | 0.0000 |  |  |

In addition, only the F-number Fno, focal length f, and FOV of each of the lens optical systems of the first to fifth embodiments illustrated in FIGS. 1 to 5 are shown in Table 8 below.

TABLE 8

| Embodiments | F-number (Fno) | Focal length (f) [mm] | Field of view (FOV) [°] |
|---|---|---|---|
| First embodiment | 2.28 | 2.257 | 80.536 |
| Second embodiment | 2.20 | 2.266 | 80.091 |
| Third embodiment | 2.28 | 2.292 | 78.639 |
| Fourth embodiment | 2.28 | 2.276 | 78.829 |
| Fifth embodiment | 2.24 | 2.171 | 81.820 |

In addition, each of the aspherical surfaces of the lenses of the lens optical systems of the first to fifth embodiments satisfies the following aspherical surface equation:

<Aspherical Surface Equation>

$$x = \frac{c'y^2}{1+\sqrt{1-(K+1)c'^2 y^2}} + Ay^4 + By^6 + Cy^8 + Dy^{10} + Ey^{12}$$

where x denotes a distance measured from the vertex of a lens in the direction of the optical axis of the lens, y denotes a distance measured from the optical axis in a direction perpendicular to the optical axis, c' denotes the reciprocal (1/r) of the radius of curvature at the vertex of the lens, K denotes a conic constant, and A, B, C, D, and E denote aspherical surface coefficients.

Tables 9 to 13 below show aspherical surface coefficients of the aspherical surfaces of the lens optical systems of the first to fifth embodiments respectively illustrated in FIGS. 1 to 5. That is, Tables 9 to 13 show the aspheric surface coefficients of the entrance surfaces 2\*, 4\*, and 6\*, and the exit surfaces 3\*, 5\*, and 7\* of the lenses of Tables 3 to 7.

TABLE 9

| Surfaces | K | A | B | C | D | E |
|---|---|---|---|---|---|---|
| 2* | 0.2833 | −0.1443 | 1.5492 | −87.1043 | 1730.6604 | −19299.8857 |
| 3* | 1.1308 | −0.3820 | −3.4721 | 72.3239 | −986.5311 | 7877.9835 |
| 4* | 0.0437 | −1.1231 | 4.0503 | 63.4716 | −1500.5580 | 15064.4163 |
| 5* | 0.1046 | −1.3012 | 6.7396 | −16.6790 | −26.9713 | 592.8674 |
| 6* | −9.3371 | −0.5831 | −0.1265 | 2.2850 | −5.6496 | 8.0927 |
| 7* | −3.7773 | −0.4566 | 0.2169 | 0.6759 | −2.0060 | 2.6280 |

TABLE 10

| Surfaces | K | A | B | C | D | E |
|---|---|---|---|---|---|---|
| 2* | 0.4793 | −0.1307 | −0.3904 | 6.6904 | −113.4496 | 816.7531 |
| 3* | 1.1308 | −0.5838 | 5.1350 | −97.2316 | 932.9594 | −5637.4790 |
| 4* | 1.0069 | −1.3202 | 9.0940 | −89.8649 | 714.4641 | −3541.6744 |
| 5* | 1.1576 | −1.2036 | 3.8338 | 19.6590 | −337.6381 | 2367.0671 |
| 6* | −2.5309 | −1.1963 | 1.9267 | −3.9965 | 9.7947 | −18.6484 |
| 7* | −1.9672 | −0.5701 | 0.2890 | 0.6613 | −2.0113 | 2.6317 |

TABLE 11

| Surfaces | K | A | B | C | D | E |
|---|---|---|---|---|---|---|
| 2* | 0.4793 | −0.1307 | −0.3904 | 6.6904 | −113.4496 | 816.7531 |
| 3* | 1.1308 | −0.5838 | 5.1350 | −97.2316 | 932.9594 | −5637.4790 |
| 4* | 1.0069 | −1.3202 | 9.0940 | −89.8649 | 714.4641 | −3541.6744 |
| 5* | 1.1576 | −1.2036 | 3.8338 | 19.6590 | −337.6381 | 2367.0671 |
| 6* | −2.5308 | −1.1963 | 1.9267 | −3.9965 | 9.7947 | −18.6484 |
| 7* | −1.9672 | −2.0291 | 1.9403 | 8.3758 | −48.0550 | 118.6176 |

TABLE 12

| Surfaces | K | A | B | C | D | E |
|---|---|---|---|---|---|---|
| 2* | −0.7244 | −0.1744 | 0.1831 | −5.3471 | −57.3524 | 1528.6685 |
| 3* | −1.5204 | −0.5215 | −1.3164 | 37.6099 | −491.5876 | 3661.9884 |
| 4* | −2.5982 | −1.1595 | 12.1834 | −149.7079 | 1583.3996 | −10950.9830 |
| 5* | 3.1563 | −1.2373 | 8.6005 | −32.2613 | 86.7166 | −71.0457 |
| 6* | −6.7581 | −1.4037 | 5.2125 | −20.5296 | 61.1584 | −118.9430 |
| 7* | −4.6570 | −0.4780 | 0.9018 | −1.8478 | 3.0786 | −3.6345 |

TABLE 13

| Surfaces | K | A | B | C | D | E |
|---|---|---|---|---|---|---|
| 2* | −1.6425 | −0.1362 | −0.5683 | −1.5508 | −15.4603 | 81.8352 |
| 3* | 0.0000 | −0.7991 | 1.0774 | −23.4041 | 181.8097 | −771.5963 |
| 4* | −2.4335 | −1.2997 | 4.5982 | 35.9789 | −914.2714 | 9905.0836 |
| 5* | 1.2521 | −1.0907 | 7.2161 | −23.9611 | 73.6132 | −119.0226 |
| 6* | −6.9597 | −0.4880 | 0.3711 | −0.0926 | −0.0569 | 0.0076 |
| 7* | −4.8734 | −0.2915 | 0.1655 | −0.0021 | −0.1032 | 0.0806 |

Figure 7:
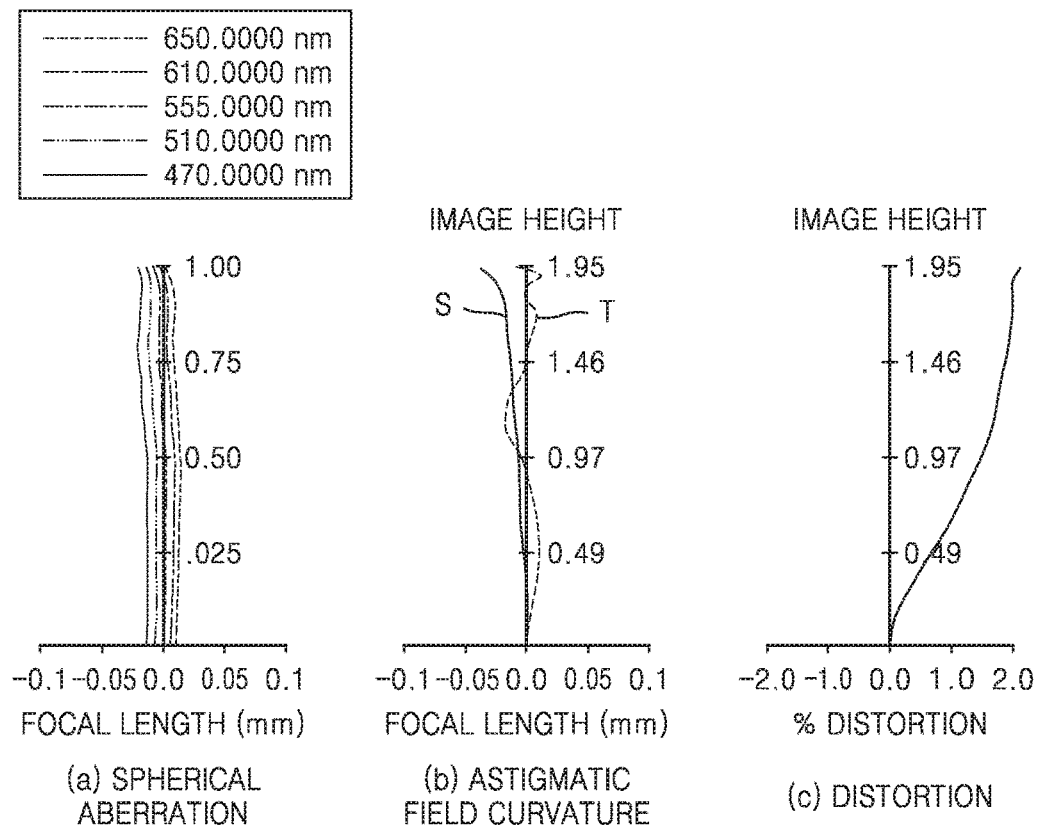
FIG. 7 is an aberration diagram illustrating longitudinal spherical aberration, astigmatic field curvature, and distortion of the lens optical system of the first embodiment.

FIG. 7 is an aberration diagram illustrating longitudinal spherical aberration, astigmatic field curvature, and distortion of the lens optical system of the first embodiment (shown in FIG. 1) having the data shown in Table 3.

In FIG. 7, the graph (a) shows the spherical aberration of the lens optical system with respect to light having various wavelengths, and the graph (b) shows the astigmatic field curvature of the lens optical system including a tangential field curvature T and a sagittal field curvature S. Data of the graph (a) were obtained using light having wavelengths of 650.0000 nm, 610.0000 nm, 555.0000 nm, 510.0000 nm, and 470.0000 nm. Data of the graphs (b) and (c) were obtained using light having a wavelength of 555.0000 nm. Graphs of FIGS. 8 and 11 were obtained in the same manner.

Figure 8:
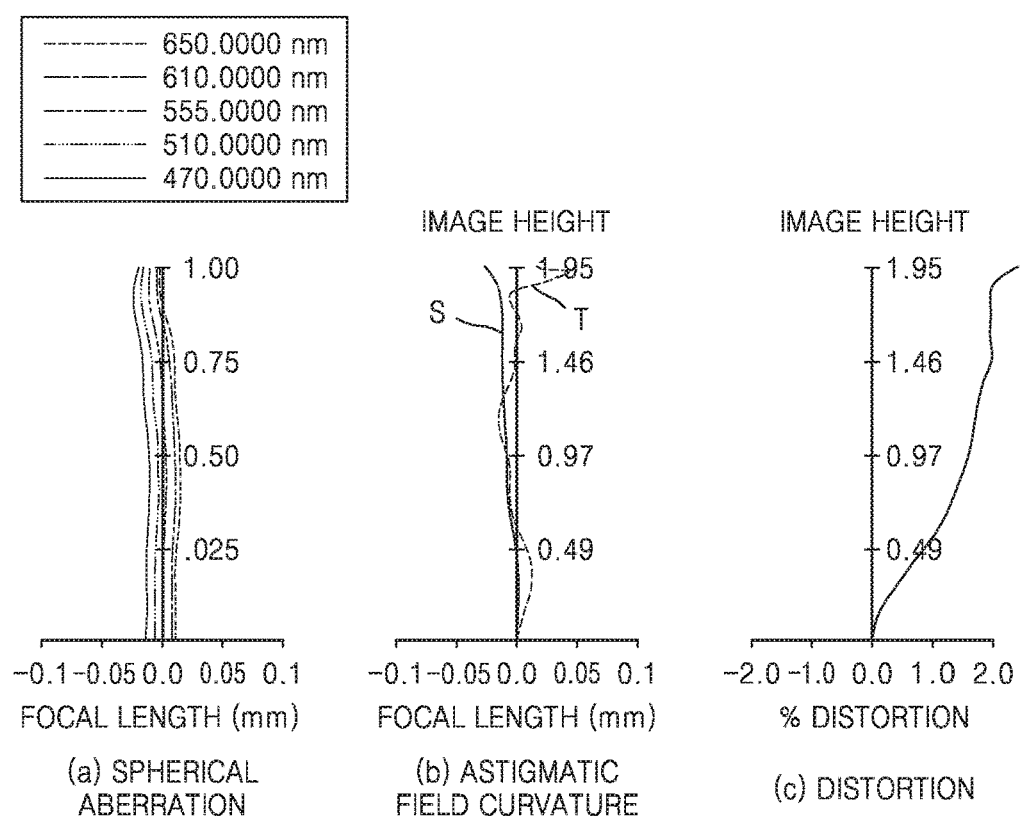
FIG. 8 is an aberration diagram illustrating longitudinal spherical aberration, astigmatic field curvature, and distortion of the lens optical system of the second embodiment.

The graphs (a), (b), and (c) of FIG. 8 illustrate longitudinal spherical aberration, astigmatic field curvature, and distortion of the lens optical system of the second embodiment (shown in FIG. 2) having the data shown in Table 4.

Figure 9:
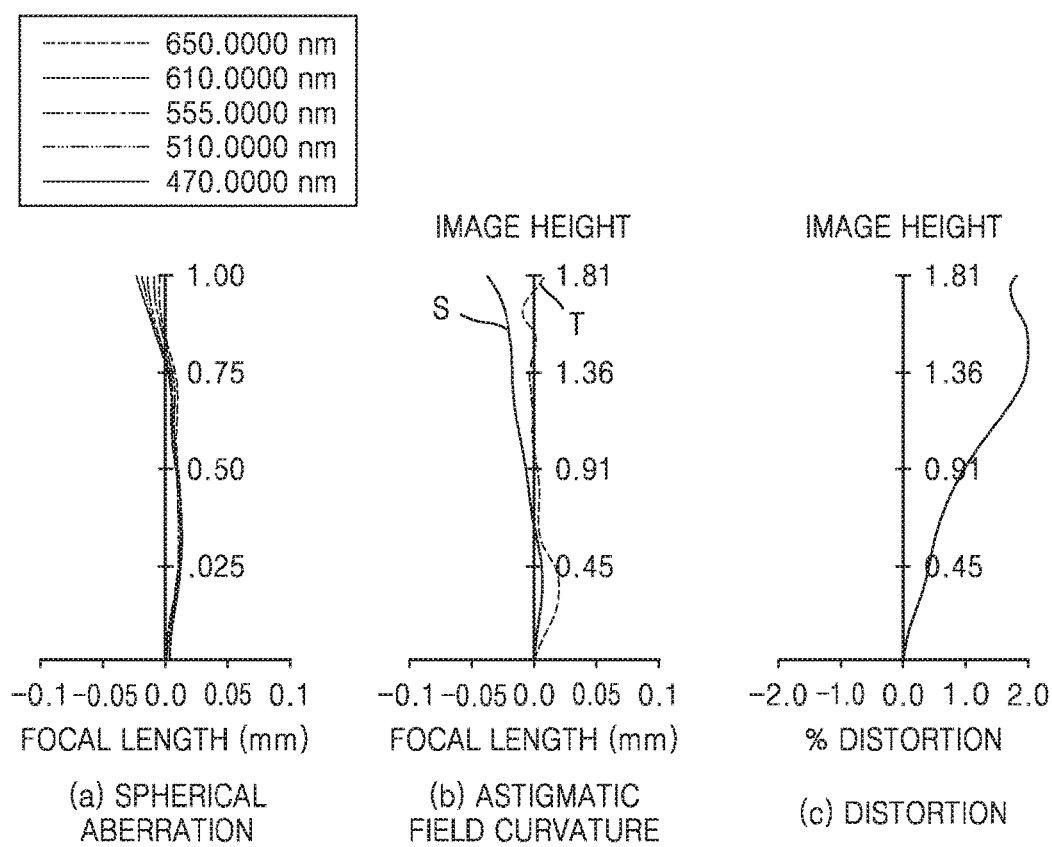
FIG. 9 is an aberration diagram illustrating longitudinal spherical aberration, astigmatic field curvature, and distortion of the lens optical system of the third embodiment.

The graphs (a), (b), and (c) of FIG. 9 illustrate longitudinal spherical aberration, astigmatic field curvature, and distortion of the lens optical system of the third embodiment (shown in FIG. 3) having the data shown in Table 5.

Figure 10:
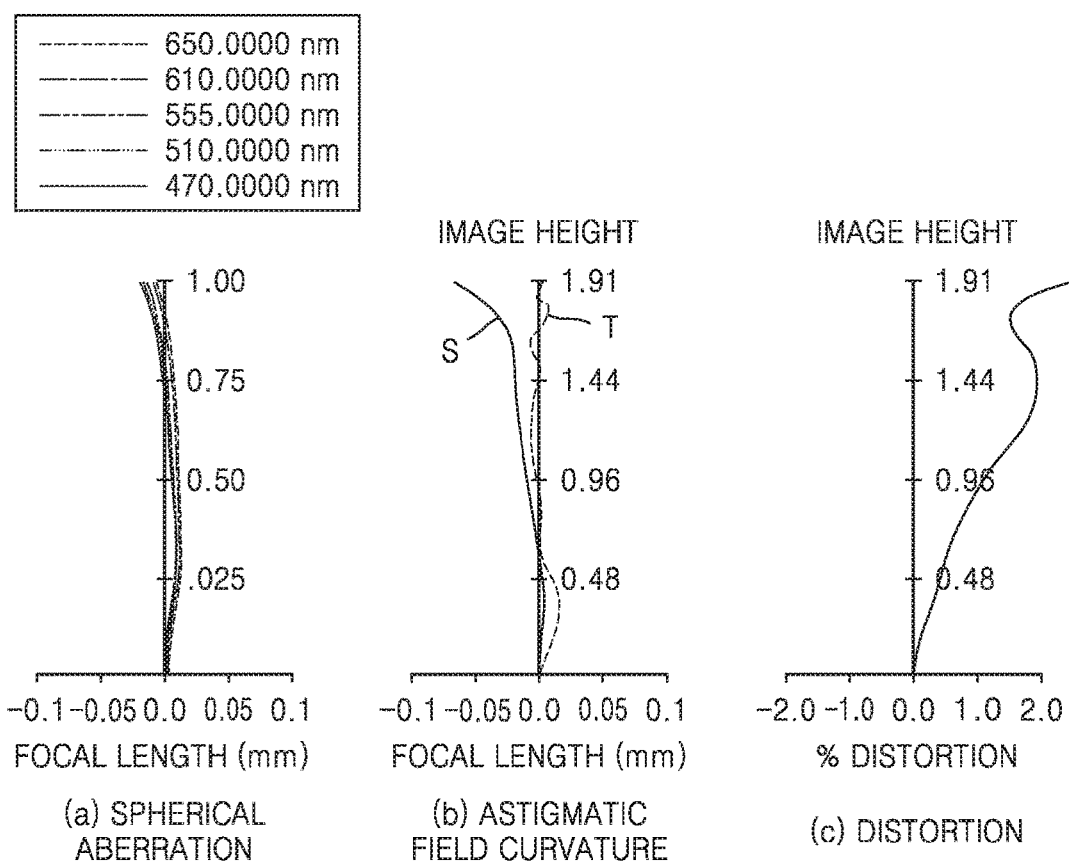
FIG. 10 is an aberration diagram illustrating longitudinal spherical aberration, astigmatic field curvature, and distortion of the lens optical system of the fourth embodiment.

The graphs (a), (b), and (c) of FIG. 10 illustrate longitudinal spherical aberration, astigmatic field curvature, and distortion of the lens optical system of the fourth embodiment (shown in FIG. 4) having the data shown in Table 6.

Figure 11:
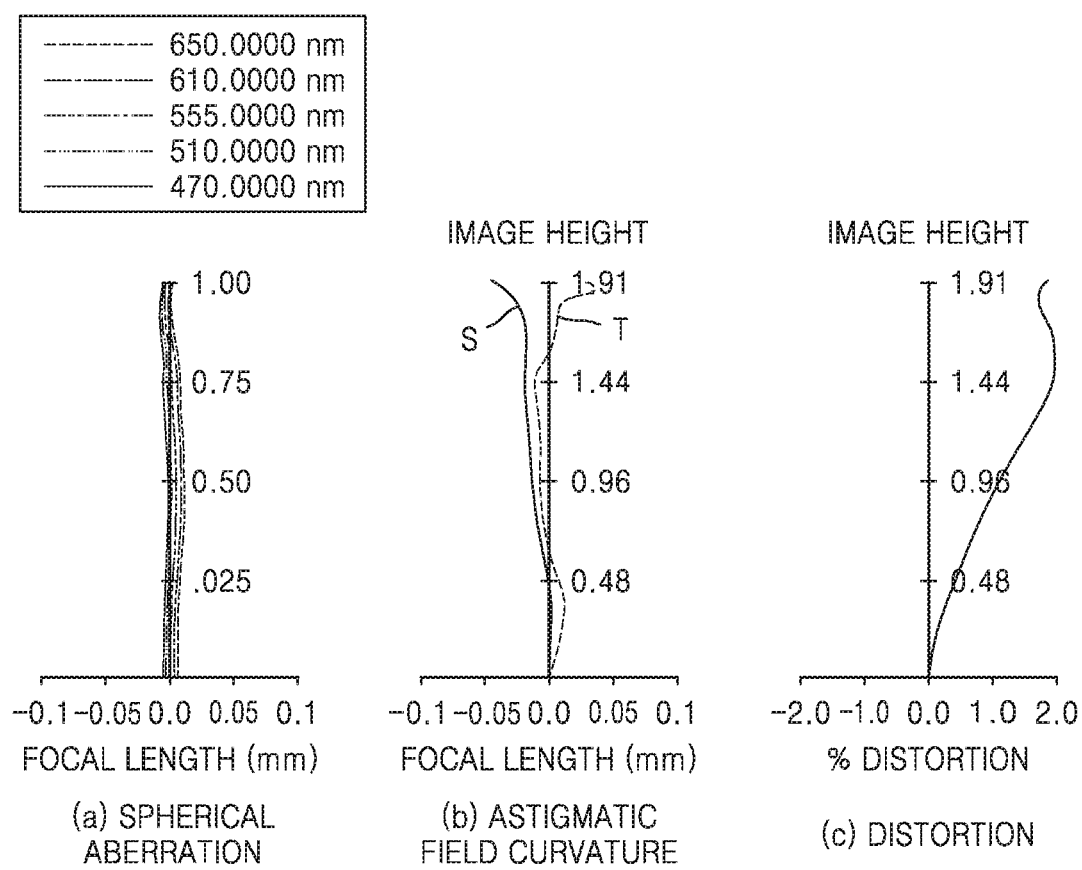
FIG. 11 is an aberration diagram illustrating longitudinal spherical aberration, astigmatic field curvature, and distortion of the lens optical system of the fifth embodiment.

The graphs (a), (b), and (c) of FIG. 11 illustrate longitudinal spherical aberration, astigmatic field curvature, and distortion of the lens optical system of the fifth embodiment (shown in FIG. 5) having the data shown in Table 7.

As described above, each of the lens optical systems of the embodiments includes the first to third lenses I to III sequentially arranged in a direction away from the object side OBJ toward the image sensor IMG and having positive (+), negative (−), and positive (+) refractive powers. Each of the lens optical systems may satisfy at least one of Formulas 1 to 7. Each of the lens optical systems may have a short total length owing to a structure constituted by three lenses, a small effective outer diameter (for example, about 3.0 mm or less), and a wide FOV of about 75° or greater, and various aberrations of the lens optical systems may be easily corrected. In addition, although the lens optical systems of the embodiments are (very) small three-lens optical systems, the lens optical systems have a low F-number Fno on the level of about 2.3 or less and thus a high degree of brightness.

Therefore, although the lens optical systems of the embodiments are (very) small, each of the lens optical systems may have a wide FOV, a high degree of brightness, and a high degree of resolution. In addition, if the first to third lenses I to III are formed of a plastic material, and at least one of both surfaces (entrance and exit surfaces) of each of the first to third lenses I to III is an aspherical surface, the lens optical systems may be manufactured to have compact structures and high performance with lower costs compared to the case of manufacturing lens optical systems using glass lenses.

It should be understood that embodiments described herein should be considered in a descriptive sense only and not for purposes of limitation. Descriptions of features or aspects within each embodiment should typically be considered as available for other similar features or aspects in other embodiments. For example, it will be apparent to those of ordinary skill in the art that although the shapes of the lenses of the lens optical systems of the embodiments are modified to some degree, the above-described effects can be obtained if the lens optical systems satisfy at least one of Formulas 1 to 7. In addition, those of ordinary skill in the art may use a blocking film as the infrared blocking element IV instead of using a filter as the infrared blocking element IV. While one or more embodiments have been described with reference to the figures, it will be understood by those of ordinary skill in the art that various changes in form and details may be made therein without departing from the spirit and scope of the inventive concept as defined by the following claims.

What is claimed is:

1. A lens optical system comprising a first lens, a second lens, and a third lens sequentially arranged in a direction away from an object between the object and an image sensor on which an image of the object is formed, wherein the first lens has a positive (+) refractive power and an entrance surface convex toward the object, the second lens has a negative (−) refractive power and a meniscus shape convex toward the image sensor, the third lens has a positive (+) refractive power, and at least one of an entrance surface and an exit surface of the third lens has an inflection point in a direction away from a center region toward an edge thereof, and the lens optical system satisfies the following formulas:

$$2.6 < D3 < 3.0$$

$$1.3 < ImgH_{MAX}/D3 < 1.5$$

where D3 refers to an outer diameter of the exit surface of the third lens in millimeters (mm), and $ImgH_{MAX}$ refers to a diagonal length of a maximum pixel region of the image sensor.

2. The lens optical system of claim 1, wherein the lens optical system satisfies the following formula:

$$75° < FOV < 85°$$

where FOV refers to a field of view of the lens optical system.

3. The lens optical system of claim 1, wherein the lens optical system satisfies the following formula:

$$2.0 < Fno < 2.3$$

where Fno is an F-number of the lens optical system.

4. The lens optical system of claim 1, wherein the lens optical system satisfies the following formula:

$$0.75 < TTL/ImgH < 0.83$$

where TTL refers to a distance from the entrance surface of the first lens to the image sensor, and ImgH refers to a diagonal length of an effective pixel region of the image sensor.

5. The lens optical system of claim 1, wherein the lens optical system satisfies the following formula:

$$0.55 < f/ImgH < 0.70$$

where f refers to a total focal length of the lens optical system, and ImgH refers to a diagonal length of an effective pixel region of the image sensor.

6. The lens optical system of claim 1, wherein the lens optical system satisfies the following formula:

$$1.55 < (Nd2+Nd3)/2 < 1.65$$

where Nd2 refers to an refractive index of the second lens, and Nd3 refers to a refractive index of the third lens.

7. The lens optical system of claim 1, wherein the first lens has an exit surface convex toward the image sensor.

8. The lens optical system of claim 1, wherein the first lens has an exit surface concave toward the image sensor.

9. The lens optical system of claim 1, wherein the entrance surface of the third lens is convex toward the object in a center region of the entrance surface and concave toward the object in a region defined from the center region toward an edge of the entrance surface, and the exit surface of the third lens is concave toward the image sensor in a center region of the entrance surface and convex toward the image sensor in a region defied from the center region toward an edge of the exit surface.

10. The lens optical system of claim 1, wherein the first to third lenses are aspherical lenses.

11. The lens optical system of claim 1, wherein the first to third lenses are plastic lenses.

12. The lens optical system of claim 1, further comprising an aperture stop between the object and the first lens.

13. A lens optical system comprising a first lens, a second lens, and a third lens sequentially arranged in a direction away from an object between the object and an image sensor on which an image of the object is formed, wherein the first lens, the second lens, and the third lens have positive (+), negative (−), and positive (+) refractive powers, respectively, and the lens optical system satisfies the following formulas:

$$2.6 < D3 < 3.0$$

$$1.3 < ImgH_{MAX}/D3 < 1.5$$

$$75° < FOV < 85°$$

$$2.0 < Fno < 2.3$$

where D3 refers to an outer diameter of an exit surface of the third lens in millimeters (mm), $ImgH_{MAX}$ refers to a diagonal length of a maximum pixel region of the image sensor, FOV refers to a field of view of the lens optical system, and Fno is an F-number of the lens optical system.

14. The lens optical system of claim 13, wherein the lens optical system satisfies at least one of the following formulas:

$$0.75 < TTL/ImgH < 0.83$$

$$0.55 < f/ImgH < 0.70$$

$$1.55 < (Nd2+Nd3)/2 < 1.65$$

where TTL refers to a distance from an entrance surface of the first lens to the image sensor, ImgH refers to a diagonal length of an effective pixel region of the image sensor, f refers to a focal length of the lens optical system, Nd2 refers to an refractive index of the second lens, and Nd3 refers to a refractive index of the third lens.

15. The lens optical system of claim 13, wherein the first lens is convex toward the object, the second lens is convex toward the image sensor, and the third lens is an aspherical lens.

* * * * *